US011718710B2

(12) United States Patent
Moore et al.

(10) Patent No.: US 11,718,710 B2
(45) Date of Patent: Aug. 8, 2023

(54) METHOD OF LIGHT-PROMOTED FRONTAL RING-OPENING METATHESIS POLYMERIZATION

(71) Applicant: The Board of Trustees of the University of Illinois, Urbana, IL (US)

(72) Inventors: Jeffrey S. Moore, Savoy, IL (US); Nancy R. Sottos, Champaign, IL (US); Kevin J. Schwarz, St. Paul, MN (US); Katherine J. Stawiasz, Urbana, IL (US); Justine E. Paul, Savoy, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 17/500,436

(22) Filed: Oct. 13, 2021

(65) Prior Publication Data

US 2022/0112332 A1 Apr. 14, 2022

Related U.S. Application Data

(60) Provisional application No. 63/091,403, filed on Oct. 14, 2020.

(51) Int. Cl.
*C08G 61/08* (2006.01)
*C08F 2/50* (2006.01)
*C08F 4/80* (2006.01)

(52) U.S. Cl.
CPC ............... *C08G 61/08* (2013.01); *C08F 2/50* (2013.01); *C08F 4/80* (2013.01)

(58) Field of Classification Search
CPC ........ C08G 61/08; C08G 61/06; C08G 61/04; C08F 2/46; C08F 2/48; C08F 2/50; C08F 232/08; C08F 232/06
See application file for complete search history.

(56) References Cited

U.S. PATENT DOCUMENTS 6,310,121 B1 10/2001 Woodson, Jr. et al.
6,803,429 B2 10/2004 Morgan et al.
(Continued)

FOREIGN PATENT DOCUMENTS

EP 2903996 B1 8/2015
WO WO 2014/055720 A1 4/2014
(Continued)

OTHER PUBLICATIONS

Roberson, I.D.; Dean, L.M.; Rudebusch, G.E.; Sottos, N.R.; White, S.R.; Moore, U.S. ACS Macro Letts. 2017, 6, 609-612. (Year: 2017).*

(Continued)

*Primary Examiner* — Rip A Lee
(74) *Attorney, Agent, or Firm* — Crowell & Moring LLP

(57) ABSTRACT

A method of light-promoted frontal ring-opening metathesis polymerization includes providing a monomer solution including dicyclopentadiene, a ruthenium-based catalyst and a phosphite inhibitor, and exposing the monomer solution to ultraviolet light having a wavelength in a range from 315 nm to 400 nm, thereby initiating an exothermic polymerization reaction and generating a self-propagating polymerization front. The polymerization front moves through the monomer solution and polymerizes the dicyclopentadiene.

19 Claims, 4 Drawing Sheets

(56) References Cited

U.S. PATENT DOCUMENTS

| | | | |
|---|---|---|---|
| 10,273,327 B2* | 4/2019 | Boydston | C08G 61/08 |
| 10,487,446 B2* | 11/2019 | Robertson | C08J 5/243 |
| 10,920,002 B2* | 2/2021 | Moore | C08K 5/524 |
| 11,230,624 B2* | 1/2022 | Burtovyy | B33Y 70/00 |
| 2005/0250878 A1 | 11/2005 | Moore et al. | |
| 2010/0029801 A1 | 2/2010 | Moszner et al. | |
| 2015/0328848 A1 | 11/2015 | Patrick et al. | |
| 2016/0236983 A1 | 8/2016 | Buergel et al. | |
| 2016/0354977 A1 | 12/2016 | Gordon | |
| 2017/0101488 A1 | 4/2017 | Thomson et al. | |
| 2017/0240694 A1 | 8/2017 | Schrock et al. | |
| 2018/0327531 A1* | 11/2018 | Moore | B33Y 30/00 |
| 2019/0039321 A1 | 2/2019 | Matzner et al. | |
| 2019/0202953 A1 | 7/2019 | Lesser et al. | |
| 2021/0163676 A1* | 6/2021 | Balasu | B01J 31/2278 |

FOREIGN PATENT DOCUMENTS

| | | | |
|---|---|---|---|
| WO | WO 2016/036976 A1 | 3/2016 | |
| WO | WO 2017/068590 A1 | 4/2017 | |
| WO | WO 2017/134674 A1 | 8/2017 | |
| WO | WO 2020/006345 A1 | 1/2020 | |
| WO | WO 2020/099750 A1 * | 5/2020 | B01J 31/02 |
| WO | WO 2021/188332 A1 | 9/2021 | |

OTHER PUBLICATIONS

Mariani, A.; Fiori, S.; Chekanov, Y.; Pojman, J.A. Macromolecules 2001, 34, 6539-6541. (Year: 2001).*

Ruiu, A.; Sanna, D.; Alzari, V.; Nuvoli, D.; Mariani, A. J. Polym. Sci. Part A: Polym. Chem. 2014, 52, 2776-2780. (Year: 2014).*

Abliz, "Curing Methods for Advanced Polymer Composites—A Review," Polymers and Polymer Composites, 21, 6, (2013) pp. 1-9.

Aharoni et al., "Ligand Isomerization in Sulfur-Chelated Ruthenium Benzylidenes," Organometallics, 30, (2011), pp. 1607-1615.

Ben-Asuly, "Photoactivation of Ruthenium Olefin Metathesis Initiators," Organometallics, Organometallics, 28 (2009), pp. 4652-4655.

Bomze et al., "Successful Radical Induced Cationic Frontal Polymerization of Epoxy-Based Monomers by C-C Labile Compounds," Polymer Chemistry, 6, (2015) pp. 8161-8167.

Cabral et al., "Frontal Photopolymerization for Microfluidic Applications," Langmuir, 20, (2004), pp. 10020-10029.

Crivello, "Investigation of the Photoactivated Frontal Polymerization of Oxetanes Using Optical Pyrometry," Polymer, 46, (2005), pp. 12109-12117.

Compton and Lewis, "3D-Printing of Lightweight Cellular Composites," Adv. Mater., 26, (2104) pp. 5930-5935.

Diesendruck et al., "Predicting the Cis-Trans Dichloro Configuration of Group 15-16 Chelated Ruthenium Olefin Metathesis Complexes: A DFT and Experimental Study," Inorganic Chemistry, 48, (2009), pp. 10819-10825.

Ebewele, Chapter 10, "Polymer Reaction Engineering," in Polymer Science and Technology, 4$^{th}$ Edition CRC Press LLC, (2000), 1-33 pp.

Eivgi and Lemcoff, "Turning the Light On: Recent Developments in Photoinduced Olefin Metathesis," Synthesis, 50, (2018), pp. 49-63.

Eivgi et al., "Photoactivation of Ruthenium Phosphite Complexes for Olefin Metathesis," ACS Catalysis, 8, (2018), pp. 6413-6418.

Fan et al., "Laser-Ignited Frontal Polymerization of Shape-Controllable Poly(VI-Co-AM) Hydrogels Based on 3D Templates toward Adsorption of Heavy Metal Ions," Applied Physics A, 122, 599, (2016), 1-9 pp.

Goli et al. "Frontal polymerization accelerated by continuous conductive elements," J. Appl. Polym. Sci., 136,17, (2019) p. 47418 (Abstract only).

Göstl et al., "Remote-Controlling Chemical Reactions by Light: Towards Chemistry with High Spatio-Temporal Resolution," Chem. Soc. Rev. Royal Society of Chemistry, 43, (2014), pp. 1982-1996.

Ivanoff et al., "Crosslinking Agents for Enhanced Performance of Thermosets Prepared via Frontal Ring-Opening Metathesis Polymerization," Macromolecules, 53, (2020), pp. 8360-8366.

Kunkely and Vogler, "Photoreactivity of Bis(Tricyclohexylphosphine)Benzylidene Ruthenium Dichloride (Grubbs's Catalyst)," Inorganica Chimica Acta, 325, (2001), pp. 179-181.

Leibfarth et al., "External Regulation of Controlled Polymerizations," Angewandte Chemie International Edition, 52 (2013), pp. 199-210.

Mariani and Fiori, "Frontal Ring-Opening Metathesis Polymerization of Dicyclopentadiene," Macromolecules, 34, (2001), pp. 6539-6541.

Mariani et al., "UV-Ignited Frontal Polymerization of an Epoxy Resin," Journal of Polymer Science: Part A: Polymer Chemistry, 42 (2004), pp. 2066-2072.

Monsaert et al., "Latent Olefin Metathesis Catalysts," Chemical Society Reviews, 38, (2009), pp. 3360-3372.

Nason et al., "UV-Induced Frontal Polymerization of Multifunctional (Meth)Acrylates," Macromolecules, 38 (2005), pp. 5506-5512.

Nason et al., "The Effect of a Trithiol and Inorganic Fillers on the Photo-Induced Thermal Frontal Polymerization of a Triacrylate," Journal of Polymer Science: Part A: Polymer Chemistry, 46 (2008), pp. 8091-8096.

Nesvadba, "Radical Polymerization in Industry," In Encyclopedia of Radicals in Chemistry, Biology and Materials, John Wiley & Sons (2012), pp. 1-36.

Norrish and Smith, "Catalysed Polymerization of Methyl Methacrylate in the Liquid Phase," Nature, 150 (1942), pp. 336-337.

Odian, Principles of Polymerization, Fourth Edition, Wiley-Interscience, (2004), pp. 1-834.

Pojman, "Frontal Polymerization," in Polymer Science: A Comprehensive Reference, vol. 4, Elsevier B.V. (2012), pp. 957-980.

Pojman et al., "Free-Radical Frontal Polymerization: Self-Propagating Thermal Reaction Waves," J. Chem. Soc., Faraday Trans., 92, 16, (1996), pp. 2825-2837.

Potzmann et al., "UV-Initiated Bubble-Free Frontal Polymerization in Aqueous Conditions," Macromolecules, 48, (2015), pp. 8738-8745.

Robertson et al., "Rapid Energy-Efficient Manufacturing of Polymers and Composites via Frontal Polymerization," Nature, 557, (2018), pp. 223-227.

Robertson et al., "Alkyl Phosphite Inhibitors for Frontal Ring-Opening Metathesis Polymerization Greatly Increase Pot Life," ACS Macro Lett., 6 (2017), pp. 609-612.

Robertson et al., "Frontal Ring-Opening Metathesis Polymerization of Exo-Dicyclopentadiene for Low Catalyst Loadings," ACS Macro Lett., 5(5):593-596, Apr. 2016.

Ruiu et al., "Advances in the frontal ring opening metathesis polymerization of dicyclopentadiene," J. Polym. Sci. Part A: Polym. Chem., 52, 19 (2014) p. 2776. (Abstract only).

Sanford et al., "New Insights into the Mechanism of Ruthenium-Catalyzed Olefin Metathesis Reactions," J. Am. Chem. Soc., 123, (2001), pp. 749-750.

Sanford et al., "Mechanism and Activity of Ruthenium Olefin Metathesis Catalysts," J. Am. Chem. Soc. 123, (2001), pp. 6543-6554.

Sangermano et al., "UV-Activated Frontal Polymerization of Glass Fibre Reinforced Epoxy Composites," Composites Part B: Engineering, 143, (2018), pp. 168-171.

Teator et al., "An Isolable, Photoswitchable N-Heterocyclic Carbene: On-Demand Reversible Ammonia Activation," Angewandte Chemie International Edition, 54, (2015), pp. 11559-11563.

Teator et al., "Remote Control Grubbs Catalysts That Modulate Ring-Opening Metathesis Polymerizations," Journal of Polymer Science Part A: Polymer Chemistry, 55, (2017), pp. 2949-2960.

Teator et al., "Switchable Polymerization Catalysts," Chem. Rev. 116, (2016), pp. 1969-1992.

Theunissen et al., "Visible-Light-Controlled Ruthenium-Catalyzed Olefin Metathesis," J. Am. Chem. Soc. 141 (17) (2019), pp. 6791-6796.

(56) References Cited

OTHER PUBLICATIONS

Tulig and Tirrell, "Toward a Molecular Theory of the Trommsdorff Effect," Macromolecules, 14, (1981), pp. 1501-1511.
Tulig and Tirrell, "On the Onset of the Trommsdorff Effect," Macromolecules, 15, (1982), pp. 459-463.
Vallons et al., "Assessment of the Mechanical Behaviour of Glass Fibre Composites with a Tough Polydicyclopentadiene (PDCPD) Matrix," Composites Part A, 78, (2015), pp. 191-200.
Vidavsky and Lemcoff, "Light-Induced Olefin Metathesis," Beilstein J. Org. Chem. 6, (2010), pp. 1106-1119.
Wang et al., "Thermal Research on the Uncontrolled Behavior of Styrene Bulk Polymerization," Journal of Loss Prevention in the Process Industries, 57, (2019), pp. 239-244.
White and Kim, "A Simultaneous Lay-Up and In situ Cure Process for Thick Composites," Journal of Reinforced Plastics and Composites, 12, (1993) pp. 520-535.
Zhou et al., "Facile Access to Poly(NMA-Co-VCL) Hydrogels via Long Range Laser Ignited Frontal Polymerization," J. Mater. Chem. A, 1, (2013), pp. 7326-7331.
Zhou et al., "Fast Curing of Thick Components of Epoxy via Modified UV-Triggered Frontal Polymerization Propagating Horizontally," Materials Letters, 176, (2016), pp. 228-231.

\* cited by examiner

METHOD OF LIGHT-PROMOTED FRONTAL RING-OPENING METATHESIS POLYMERIZATION

RELATED APPLICATION

The present patent document claims the benefit of priority under 35 U.S.C. § 119(e) to U.S. Provisional Patent Application Ser. No. 63/091,403, which was filed on Oct. 14, 2020, and is hereby incorporated by reference in its entirety.

TECHNICAL FIELD

The present disclosure is related generally to frontal polymerization and more particularly to a method of initiating frontal ring-opening metathesis polymerization (FROMP) with light.

BACKGROUND

Bulk polymerizations convert neat or highly concentrated monomeric mixtures to polymers in an exothermic fashion while providing minimal contamination of products. The resulting polymeric materials typically display both high optical clarity and molecular weights, without requiring significant post-polymerization purification or processing. Controlled bulk polymerizations may thus have reduced economic and environmental impacts on both company and consumer. As a result, bulk polymerization is a ubiquitous technique employed in a variety of industrial settings. Several key drawbacks exist, however, that directly stem from the associated reaction exothermicity and activation energy. Uncontrolled heat dissipation, for example, results in localized hot spots, which may degrade the material or initiate auto-acceleration phenomenon (i.e., gel-effect). Elaborate reaction vessels equipped with mixing apparatuses may circumvent these effects, although with a sizable capital investment cost.

Frontal polymerizations (FPs) are a useful subset of bulk polymerizations which harness the exothermic and auto-accelerating events in a controlled fashion to enable productive and rapid monomer consumption. Highly localized and short lived external stimuli activate a latent initiator or catalyst to induce a reaction zone (i.e., front). The resultant heat of polymerization promotes further reactions to rapidly polymerize available monomer. While thermal initiation is easily implemented with a soldering iron, poor spatial and temporal control limits this process by requiring close contact to the heat source.

BRIEF SUMMARY

A method of light-promoted frontal ring-opening metathesis polymerization includes providing a monomer solution including dicyclopentadiene, a ruthenium-based catalyst and a phosphite inhibitor, and exposing the monomer solution to ultraviolet light having a wavelength in a range from 315 nm to 400 nm, thereby initiating an exothermic polymerization reaction and generating a self-propagating polymerization front. The polymerization front moves through the monomer solution and polymerizes the dicyclopentadiene.

DETAILED DESCRIPTION

Figure 1:
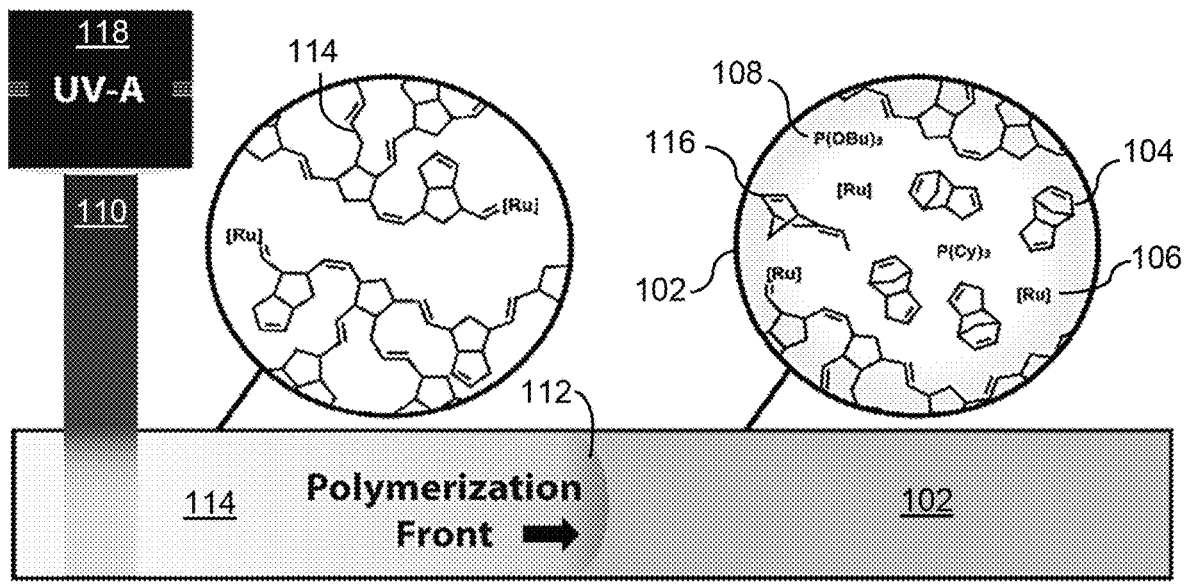
FIG. 1 is a schematic of light-activated frontal ring-opening metathesis polymerization.

A UV-A initiated strategy for frontal polymerization is described in this disclosure. Light is an attractive stimulus to achieve spatial and temporal control over reaction events in a non-contact manner. Referring to FIG. 1, the light-initiated strategy for frontal polymerization comprises providing a monomer solution 102 including dicyclopentadiene (DCPD) 104, a ruthenium-based catalyst 106 and a phosphite inhibitor 108, as discussed further below. The monomer solution may also include 5-ethylidene-2-norbornene (ENB) 116 to depress the melting point of the dicyclopentadiene 104, which may be solid at room temperature. In one example, the monomer solution may include about 5 wt. % ENB. The monomer solution 102 is exposed to ultraviolet light 110 having a wavelength in a range from 315 nm to 400 nm to initiate an exothermic polymerization reaction, which generates a self-propagating polymerization front 112 in the monomer solution. The polymerization front 112 moves through the monomer solution 102 and rapidly polymerizes the dicyclopentadiene 104, thereby effecting frontal polymerization to form poly(DCPD) 114. As illustrated in FIG. 1, the exothermic polymerization reaction may be initiated within a local region of the monomer solution 102 directly exposed to the ultraviolet light 110, and the polymerization front 112 may propagate away from the local region to effect polymerization throughout the monomer solution 102.

Figure 2:
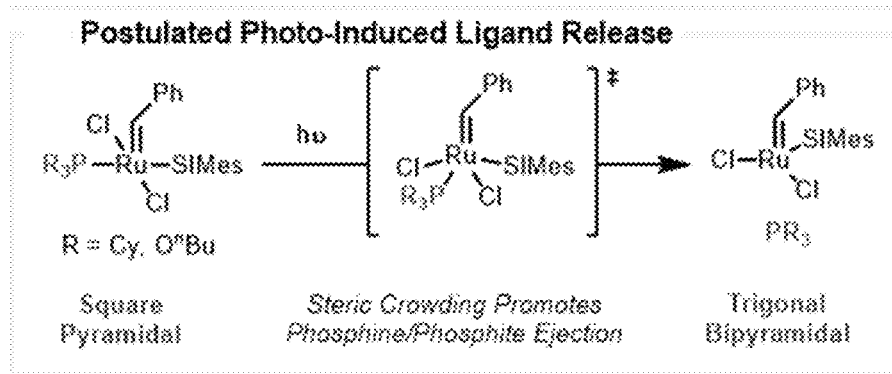
FIG. 2 illustrates a postulated mechanism for light-promoted dissociation for the Grubbs' second generation catalyst (GC2)/phosphite system.

Surprisingly, the monomer solution 102 does not require a photoinitiator. This is noteworthy because the ruthenium-based catalyst 106 is not known to be photoactive and has not been designed for photoactivity. Nor has a mechanism for the photoactivity of this catalyst been previously postulated. The inventors believe that exposing the monomer solution 102 to ultraviolet light 110 may induce phosphine or phosphite dissociation from the ruthenium-based catalyst 106, as illustrated in FIG. 2, thereby resulting in the observed photoactivity and the controlled initiation of frontal polymerization.

The ultraviolet light 110 may be emitted by a UV source 118 such as a lamp, a light emitting diode (LED), or a laser. The wavelength of the UV-A light is typically in the range from about 365 nm to about 375 nm. The ultraviolet light 110 may be focused on or beneath a surface of the monomer solution. In some cases, the ultraviolet light 110 may be emitted by multiple UV sources. It is contemplated that interference effects may be employed to generate multiple polymerization fronts in the monomer solution 102.

Preferably, the exposure to ultraviolet light 110 takes place shortly after preparation of the monomer solution 102 to prevent premature curing or gelation. For example, the exposure may take place within one or two hours of preparing the monomer solution 102. Preparation of the monomer solution 102 may comprise forming a mixture of the DCPD 104, the ruthenium-based catalyst 106 and the phosphite inhibitor 108. The mixing may entail mechanical stirring and/or sonication. The mixture may optionally include an organic solvent. For example, prior to mixing with the inhibitor 108 and the DCPD 104, the catalyst 106 may be dispersed and/or dissolved in an organic solvent. The preparation may take place at room temperature (e.g., 20-25° C.). In some cases, before or after mixing, the monomer solution may be passed through basic alumina for purification. Due to the liquid state of the monomer solution 102 prior to polymerization, the monomer solution 102 may have a storage modulus of less than 1 Pa. The monomer solution 102 may be contained in a mold having a predetermined shape or another container for frontal polymerization. The poly(DCPD) 114 formed upon polymerization may have a size and shape determined by the mold or container, and optionally may be further processed (e.g., by machining or cutting) to a desired size and shape.

Figure 3:
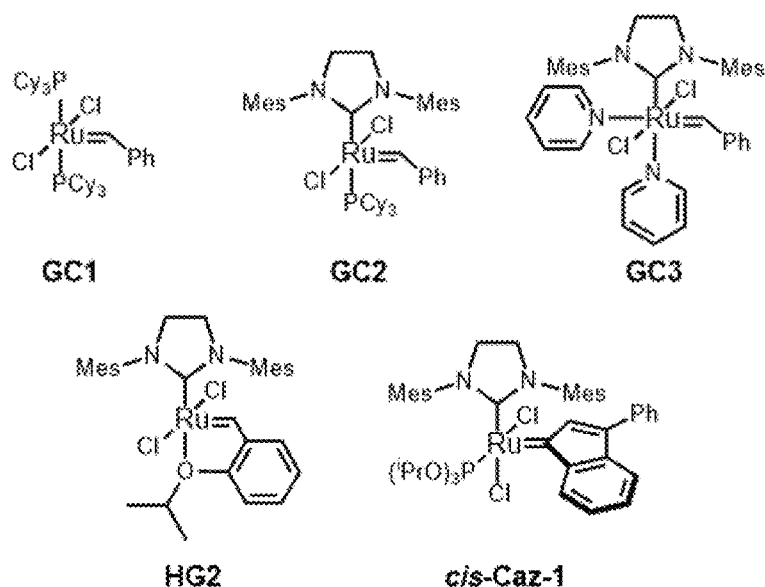
FIG. 3 identifies exemplary ruthenium-based catalysts.

The ruthenium-based catalyst 106 may comprise Grubbs' second-generation catalyst (GC2) or another Grubbs' ruthenium catalyst, examples of which are shown in FIG. 3. However, investigations of light activated frontal polymerization suggest that GC2 performs best, exhibiting light responsiveness and a capability of initiating frontal polymerization in about 6 minutes or less at a catalyst loading of 100 ppm. The phosphite inhibitor may comprise tributylphosphite (P(O"Bu)$_3$, P(NEt$_2$)$_3$, P(O-neopentyl)$_3$, P(OPh)$_3$, or P(OTMS)$_3$. The ruthenium-based catalyst may have a loading in the monomer solution in a range from about 25 ppm to about 300 ppm; typically, the loading of the ruthenium-based catalyst is in a range from about 50 ppm to about 150 ppm.

Varying GC2 and phosphite inhibitor loadings from 350 ppm to 12.5 ppm are found to result in large differences in the ability to initiate frontal polymerization. Table 1 summarizes results for frontal polymerization performed under the standard conditions shown in FIG. 4 and as well as under conditions that deviate from the standard conditions as indicated in the table, where a 375 nm light emitting diode (LED) is employed for light activation and a soldering iron is employed for thermal activation. At 350 ppm of GC2/P(O"Bu)$_3$, thermal initiation occurs to provide a stable front; at these concentrations, however, photo ignition does not occur. At lower loadings (about 25 ppm GC2/P(O"Bu)$_3$), both thermal and photo initiation results in detectable polymer fronts. Loadings lower than 12.5 ppm results in slow, non-frontal curing over several hours regardless of the initial stimulus.

The choice of phosphite inhibitor appears to have little influence on frontal polymerization initiation via heat or light. Initiation times do vary slightly between P(NEt$_2$)$_3$, which has the fastest initiation, and P(O$^i$Pr)$_3$, which shows the slowest initiation time. Light initiation is not observed using P(O$^i$Pr)$_3$ as the inhibitor, even after two hours of exposure, but instead leads to significant bulk curing. The absence of a phosphorous inhibitor altogether results in immediate reaction and gelation before all components are homogeneously mixed. Typically, the phosphite inhibitor has a loading level in the monomer solution equal to that of the ruthenium-based catalyst.

TABLE 1

Summary of Frontal Polymerization Results

| Example | Deviation from standard conditions | Light activation result | Thermal activation result |
|---|---|---|---|
| 1 | none | Complete FROMP | Complete FROMP |
| 2 | GC2/P(O"Bu)$_3$, 350 ppm | Complete FROMP | Bulk cure, no FROMP |
| 3 | GC2/P(O"Bu)$_3$, 25 ppm | Complete FROMP | Complete FROMP |
| 4 | GC2/P(O"Bu)$_3$, 12.5 ppm | Bulk cure, no FROMP | Bulk cure, no FROMP |
| 5 | P(O$^{iPr}$)$_3$ | Complete FROMP | Bulk cure, no FROMP |
| 6 | P(O-neopentyl)$_3$ | Complete FROMP | Complete FROMP |
| 7 | P(OPh)$_3$ | Complete FROMP | Complete FROMP |
| 8 | P(NEt$_2$)$_3$ | Complete FROMP | Complete FROMP |
| 9 | P(OTMS)$_3$ | Complete FROMP | Complete FROMP |

Figure 5:
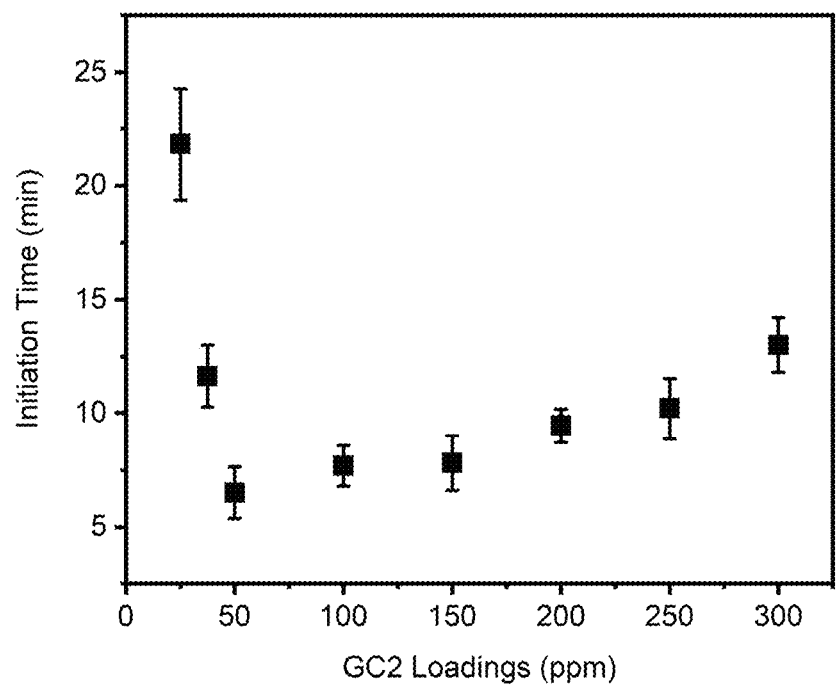
FIG. 5 plots initiation time versus GC2 loading in the monomer solution for photo-initiated FROMP reaction.

FIG. 5 shows initiation time under irradiation of 318 mW/cm$^2$ (wavelength of 375 nm) for monomer solutions with different GC2 loadings (n=3 for all data points). Generally speaking, after exposing the monomer solution to ultraviolet light, the exothermic polymerization reaction may have an initiation time of about 25 min or less; in other words, the exothermic polymerization reaction may occur within about 25 minutes of the UV-A exposure. The initiation time may also be about 12 min or less, about 6 min or less, or about 55 s or less in some examples, and/or as low as about 15 s, as discussed below. The time required to initiate frontal polymerization is found to increase above and below 50 ppm loading of the GC2. It is noted that at a 12.5 ppm loading level, the monomer solution does not gel or undergo frontal polymerization when heated. With light, the monomer solution gels after one hour, but no frontal polymerization is observed. The lower limit found for photoinitiation is 25 ppm, as indicated in FIG. 5.

Figure 6:
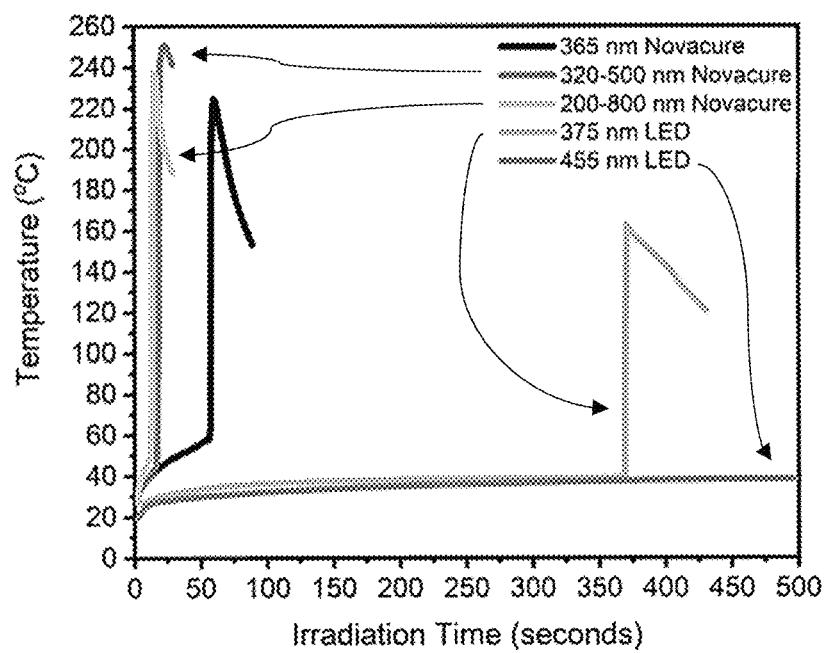
FIG. 6 plots initiation times for photo-initiated FROMP reactions based on wavelength and power, where temperature is measured using a thermocouple, and the reactions include a 10 mL monomer solution and 100 ppm GC2/P(O"Bu)$_3$.

The energy of the incident photo stimulus affects the efficacy of FROMP. Changes to the wavelength and power density may cause a significant variation in the initiation time. Experiments reveal that higher power densities are associated with faster initiation times. A 375 nm LED at 318 mW/cm$^2$ may initiate FROMP within about 6 minutes, as shown in FIG. 6. Shorter wavelength light (365 nm) with an order of magnitude increase in power density (4,750 mW/cm$^2$) may reduce the initiation time to about 55 seconds. Increasing the power density further to 17,000 mW/cm$^2$ and broadening the spectrum of light to 320-500 nm may result in initiation times as low as about 15 seconds. Notably, if the wavelength of light used (455 nm in this example) is outside of the major absorbance band for GC2 ($\lambda_{max}$=342 nm), frontal polymerization is not observed even after 20 minutes. In view of these results, it is advantageous for the ultraviolet light to have a power density of at least about 318 mW/cm$^2$, at least about 4,750 mW/cm$^2$, or at least about 10,000 mW/cm$^2$. Also or alternatively, the power density may be no higher than about 17,000 mW/cm$^2$, no higher than 10,000 mW/cm$^2$, or no higher than about 4,750 mW/cm$^2$.

Figure 4:
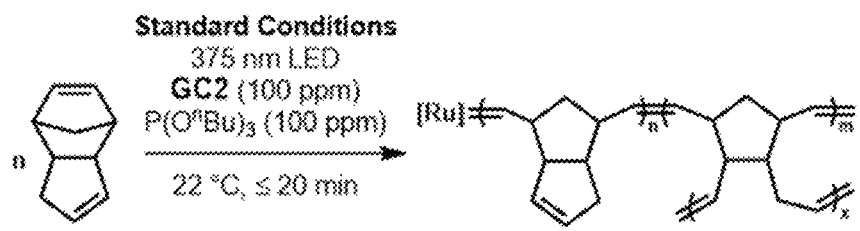
FIG. 4 illustrates what are referred to as "standard conditions" employed for frontal polymerization experiments described in this disclosure.
Figure 7:
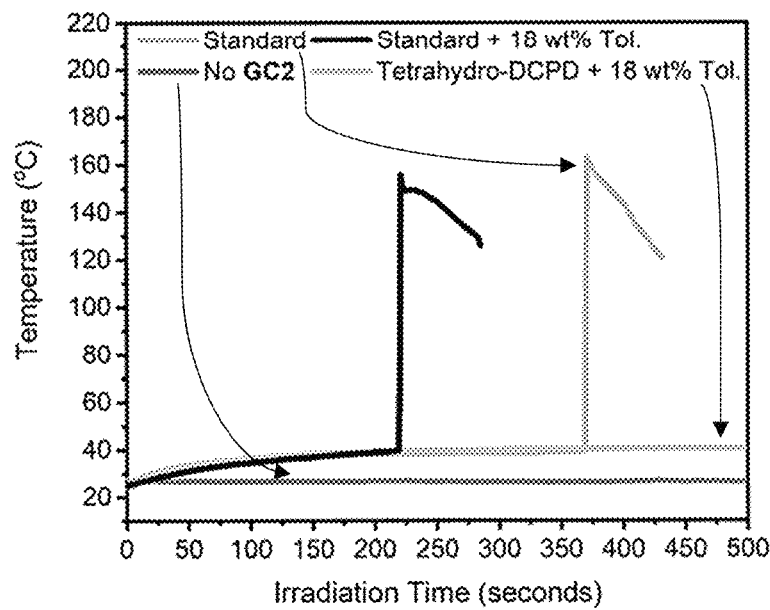
FIG. 7 plots temperature versus irradiation time for FROMP reactions under: standard conditions (10 mL monomer solution, 100 ppm GC2/P(O"Bu)$_3$); without GC2 (same as standard but without catalyst); standard conditions in toluene (10 mL solution of 82:18 DCPD:toluene by volume, 100 ppm GC2/P(O"Bu)$_3$); tetrahydro-DCPD conditions (10 g of tetrahydro-DCPD monomer (no ENB), 100 ppm GC2/P(O"Bu)$_3$).

A series of control experiments are carried out to delineate the cause of initiation as a photo, photo-thermal, or thermal effect, as shown by data of FIG. 7. Using standard conditions (or standard conditions plus 18 wt. % toluene) in a test tube with a T-type thermocouple as shown in FIG. 4, the monomer solution warms from 22° C. to 39° C. before initiation is observed. When GC2 is removed, no initiation and no increase in temperature is observed, showing that GC2 is critical to generate heat. Notably, when tetrahydro-DCPD dissolved in a minimal amount of toluene is used in place of DCPD, the temperature profile matches that of the standard run. This implicates photon absorption and nonradioactive decay from GC2 as the thermal source, as opposed to background polymerization.

Figure 8:
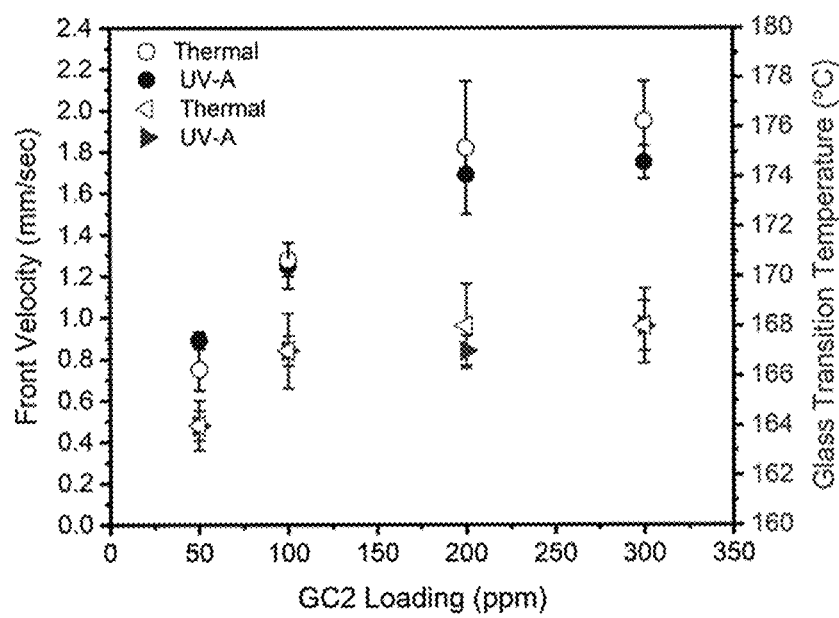
FIG. 8 provides a comparison of front speeds and glass transition temperature ($T_g$) between light and thermal initiation.

The polymerization front moves through the monomer solution and polymerizes the DCPD rapidly after initiation of the polymerization reaction. The speed of the polymerization front may be at least about 0.9 mm/s, at least about 1.3 mm/s, or at least about 1.7 mm/s, and/or as high as about 2.1 mm/s, as shown by the data of FIG. 8. The speed is found to increase with increased loading of the ruthenium-based catalyst in the monomer solution.

Nearly all polymerization characteristics and polymer thermomechanical properties of the light-activated pDCPD are comparable to those of pDCPD produced by thermally initiated FROMP. Front speeds increase from 0.8 mm/sec to 1.75 mm/sec with increasing catalyst and inhibitor concentration, consistent with what is observed in the thermal case. The glass transition temperatures ($T_g$) of the various GC2 loadings are comparable for both initiation methods and are higher than previous reports ($T_g$ about 140° C.) since a solvent-free system is used in this investigation. Regardless of the stimulus used for initiation of frontal polymerization, the final polymer product properties may not be significantly affected.

To determine if the heat generated during light-promoted FROMP is sufficient to initiate FROMP on its own, differential scanning calorimetry (DSC) is used by running isothermal holds at a range of temperatures for 20 minutes. The minimum temperature for thermal FP initiation is 50° C. (DSC), while the temperature observed for initiation using a 375 nm LED at 318 mW/cm$^2$ is 39° C. (thermocouple). In contrast to thermally-induced frontal polymerization, a temperature of the monomer solution remains less than 50° C., or less than 40° C., prior to initiation of the exothermic polymerization reaction. Since the irradiated sample never reaches 50° C. before frontal polymerization occurs, initiation promoted by photoexcitation of GC2 is highly likely. This finding is consistent with light-promoted phosphine or phosphite dissociation.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A method of light-promoted frontal ring-opening metathesis polymerization, the method comprising:
   providing a monomer solution including dicyclopentadiene, a ruthenium-based catalyst and a phosphite inhibitor;
   exposing the monomer solution to ultraviolet light having a wavelength in a range from 315 nm to 400 nm, thereby initiating an exothermic polymerization reaction and generating a self-propagating polymerization front,
   wherein the polymerization front moves through the monomer solution and polymerizes the dicyclopentadiene.

2. The method of claim 1, wherein the monomer solution does not include a photoinitiator.

3. The method of claim 1, wherein the monomer solution further comprises 5-ethylidene-2-norbornene (ENB).

4. The method of claim 1, wherein the wavelength lies in the range from about 365 nm to about 375 nm.

5. The method of claim 1, wherein the ultraviolet light has a power density of at least about 318 mW/cm$^2$.

6. The method of claim 1, wherein the power density is no higher than about 17,000 mW/cm$^2$.

7. The method of claim 1, wherein, after exposing the monomer solution to the ultraviolet light, the exothermic polymerization reaction has an initiation time of about 6 min or less.

8. The method of claim 1, wherein the ruthenium-based catalyst has a loading in the monomer solution in a range from about 25 ppm to about 300 ppm.

9. The method of claim 8, wherein the loading of the ruthenium-based catalyst is in a range from about 50 ppm to about 150 ppm.

10. The method of claim 1, wherein the phosphite inhibitor has a loading in the monomer solution equal to that of the ruthenium catalyst.

11. The method of claim 1, wherein a speed of the polymerization front is at least about 0.9 mm/s.

12. The method of claim 1, wherein the ultraviolet light is emitted by a UV source selected from the group consisting of a lamp, a light emitting diode (LED), and a laser.

13. The method of claim 1, wherein the ultraviolet light is focused on or beneath a surface of the monomer solution.

14. The method of claim 1, wherein the ultraviolet light is emitted by multiple UV sources.

15. The method of claim 1, wherein interference effects are employed to generate multiple polymerization fronts.

16. The method of claim 1, wherein the ruthenium-based catalyst comprises Grubbs' second-generation catalyst.

17. The method of claim 1, wherein the phosphite inhibitor comprises P(O"Bu)$_3$, P(NEt$_2$)$_3$, P(O-neopentyl)$_3$, P(OPh)$_3$, or P(OTMS)$_3$.

18. The method of claim 1, wherein exposing the monomer solution to ultraviolet light comprises phosphine or phosphite dissociation from the ruthenium-based catalyst.

19. The method of claim 1, wherein a temperature of the monomer solution remains less than 50° C. prior to initiation of the exothermic polymerization reaction.

* * * * *